United States Patent
Higashi et al.

(10) Patent No.: US 8,687,345 B2
(45) Date of Patent: Apr. 1, 2014

(54) CHIP-TYPE ELECTRONIC COMPONENT

(75) Inventors: Katsuaki Higashi, Kyoto-Fu (JP); Koji Matsushita, Kyoto-Fu (JP); Kiyoyasu Sakurada, Kyoto-Fu (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 183 days.

(21) Appl. No.: 13/150,537

(22) Filed: Jun. 1, 2011

(65) Prior Publication Data

US 2011/0299221 A1   Dec. 8, 2011

(30) Foreign Application Priority Data

Jun. 4, 2010   (JP) .................................. 2010-128675

(51) Int. Cl.
*H01G 4/228* (2006.01)
*H01G 2/20* (2006.01)

(52) U.S. Cl.
USPC ...................... 361/306.3; 361/309; 361/308.1

(58) Field of Classification Search
USPC .......................... 361/306.1, 306.3, 309, 308.1
See application file for complete search history.

(56) References Cited

U.S. PATENT DOCUMENTS

| | | | |
|---|---|---|---|
| 7,362,559 B2 * | 4/2008 | Tominaga | 361/306.1 |
| 2007/0242416 A1 | 10/2007 | Saito et al. | |
| 2008/0073108 A1 | 3/2008 | Saito et al. | |
| 2008/0128860 A1 | 6/2008 | Sawada et al. | |

FOREIGN PATENT DOCUMENTS

| | | |
|---|---|---|
| EP | 0 289 239 A2 | 11/1988 |
| EP | 1 693 864 A1 | 8/2006 |
| EP | 2 034 496 A1 | 3/2009 |
| JP | 4-257211 A | 9/1992 |
| JP | 08-107039 A | 4/1996 |
| JP | 10189385 A * | 7/1998 |
| JP | 10-284343 A | 10/1998 |
| JP | 11-219849 A | 8/1999 |
| JP | 2008-071926 A | 3/2008 |
| JP | 2009-170835 A | 7/2009 |
| KR | 20040027845 * | 4/2004 |
| KR | 2008-0020694 A | 3/2008 |

OTHER PUBLICATIONS

Japanese Office Action issued for corresponding application JP 2010-128675, mail date Aug. 21, 2012 (with English translation).

* cited by examiner

*Primary Examiner* — Eric Thomas
(74) *Attorney, Agent, or Firm* — Dickstein Shapiro LLP

(57) ABSTRACT

A chip-type electronic component with high reliability, which is able to suppress and prevent fatal damage to a ceramic body due to cracking even if a substrate with the chip-type electronic component mounted thereon undergoes a deflection. The chip-type electronic component includes a ceramic body having internal electrodes; resin electrode layers formed in a region including at least end surfaces of the ceramic body, and connected to the internal electrodes directly or indirectly and connected with the ceramic body; and plating metal layers covering the resin electrode layers, wherein the adhesion strength between the ceramic body and the resin electrode layer is higher than the adhesion strength between the resin electrode layer and the plating metal layer.

20 Claims, 4 Drawing Sheets

CHIP-TYPE ELECTRONIC COMPONENT

BACKGROUND OF THE INVENTION

1. Field of the Invention

The present invention relates to a chip-type electronic component including an external electrode connected to an internal conductor, and more particularly, relates to a chip-type electronic component which has an external electrode including a resin electrode layer containing a conductive constituent and a resin constituent and a plating metal layer covering the resin electrode layer.

2. Description of the Related Art

For example, a laminated ceramic capacitor which is one of typical chip-type electronic components has a structure including a body composed of a ceramic dielectric, a plurality of internal electrodes provided in the body, and an external electrode provided for electrical conduction to the plurality of internal electrodes.

Furthermore, this laminated ceramic capacitor (chip-type electronic component) is required to have an excellent effect of relaxation of stress due to a deflection of a substrate with the chip-type electronic component mounted thereon, make it less likely to degrade the electrical properties and cause cracks with higher reliability, as compared with conventional chip-type electronic components, even when the substrate is subjected to deflection stress.

Then, as a chip-type electronic component which meets the requirements, a chip-type electronic component including external electrodes on end surfaces of a chip-shaped body composed of a ceramic sintered body has been proposed in which the external electrodes each have a first electrode layer formed by sintering a conductive paste and a second electrode layer composed of a conductive resin provided to cover the first electrode, the first electrode layer and the second electrode layer are formed to wrap around the side surfaces adjacent to the end surface from the end surface of the chip-shaped body, and the wrapping around length of the first electrode layer is not more than 0.7 times the wrapping around length of the second electrode layer (see Japanese Patent Application Laid-Open No. H10-284343).

In addition, a laminated ceramic capacitor has been proposed in which an external electrode composed of, from a porcelain body side, a first conductor layer containing a glass constituent, a second conductor layer containing a resin constituent, and a third conductor layer composed of a plating metal is formed on both end surfaces of the porcelain body composed of dielectric layers and internal electrode layers stacked alternately, and when the connection strength between the porcelain body and the first conductor layer and the connection strength between the first conductor layer and the second conductor layer are respectively designated by F1 and F2, F1 and F2 satisfy the following requirements (see Japanese Patent Application Laid-Open No. H11-219849):

F1≥1.0 kgf;
F2≥1.0 kgf; and
F1>F2

However, when the chip-type electronic component from Japanese Patent Application Laid-Open No. H10-284343 is mounted onto a substrate to carry out a substrate bending test, deflection stress is concentrated on ends of the first electrode layer formed by sintering a conductive paste or of the second electrode layer composed of a conductive resin formed thereon to cause the ceramic body to be cracked from the ends, leading to a problem of defective short-circuit in some cases. Thus, the reality is that the reliability is not necessarily sufficient.

In addition, when a chip-type electronic component which has the structure as described in Japanese Patent Application Laid-Open No. H11-219849 is mounted on a substrate to carry out a substrate bending test, fracturing is caused between the first conductor layer containing a glass constituent and the second conductor layer containing a resin constituent, where the connection strength is lower than that between the porcelain body and the first conductor, to make moisture more likely to infiltrate into the porcelain body (ceramic body), thereby resulting in a problem of decreased reliability.

SUMMARY OF THE INVENTION

The present invention has been achieved in order to solve the problems described above, and an object of the present invention is to provide a chip-type electronic component which is able to suppress and prevent cracking of a ceramic body constituting the chip-type electronic component even when a substrate with the chip-type electronic component mounted thereon undergoes such a deflection that the chip-type electronic component is subjected to stress, and has excellent resistance to the deflection of the substrate with high reliability.

In order to solve the problems, a chip-type electronic component of the present invention includes: a ceramic body including an internal electrode; and an external electrode provided on an end surface of the internal electrode so as to provide electrical conduction to the internal electrode, wherein the external electrode includes:

a resin electrode layer containing a conductive constituent and a resin constituent, the resin electrode layer formed in a region including at least an end surface of the ceramic body, and formed to connect to the internal electrode directly or indirectly and connect with the ceramic body; and a plating metal layer formed to cover the resin electrode layer, wherein the adhesion strength between the ceramic body and the resin electrode layer is higher than the adhesion strength between the resin electrode layer and the plating metal layer.

The chip-type electronic component of the present invention can have a structure where the external electrode includes a thick-film electrode layer formed on an end surface of the ceramic body so as to provide electrical conduction to the internal electrode, and the resin electrode layer is formed to cover the thick-film electrode layer and connect with the ceramic body in a region outside a region of the thick-film electrode layer formed.

In the chip-type electronic component of the present invention, the resin electrode layer desirably has a surface Ag concentration of 2 atom % to 8 atom %.

Further, a resin constituent with a coupling agent added thereto is desirably used as a resin constituent constituting the resin electrode layer.

Further, the resin electrode layer desirably has a residual stress of 4.8 MPa or less.

In the chip-type electronic component of the present invention, the resin electrode layer is desirably provided by applying and curing a resin electrode paste containing a conductive constituent and a resin constituent, the resin constituent having a rate of decrease in weight of 4.8 weight % or less in the case of heating at 200° C. for 1 hour.

The chip-type electronic component according to the present invention includes: a resin electrode layer containing a conductive constituent and a resin constituent, the resin electrode layer formed in a region including at least an end surface of the ceramic body, and formed to connect to the internal electrode directly or indirectly and connect with the ceramic body; and a plating metal layer formed to cover the resin electrode layer, and in the chip-type electronic component, the adhesion strength between the ceramic body and the resin electrode layer is higher than the adhesion strength between the resin electrode layer and the plating metal layer. Thus, when a substrate with the chip-type electronic component according to the present invention mounted, for example, by soldering of the external electrode onto a land on the substrate is subjected to deflection stress, peeling can be caused between the resin electrode layer and the plating metal layer, where the adhesion strength is lower than that between the ceramic body and the resin electrode layer, to avoid the ceramic body from being subjected to high stress. As a result, even when the substrate is subjected to high deflection stress in a substrate bending test, etc., the ceramic body can be prevented from being cracked, and a chip-type electronic component can be thus provided with high reliability.

In addition, the external electrode has a structure including the thick-film electrode layer formed on the end surface of the ceramic body so as to provide electrical conduction to the internal electrode, and the resin electrode layer is made to cover the thick-film electrode layer and connect with the ceramic body in the region outside the region of the thick-film electrode layer formed. Thus, this external electrode ensures that the resin electrode layer provides electrical conduction to the internal electrode through the thick-film electrode layer, and allows the resin electrode layer to connect with the ceramic body in the region outside the region of the thick-film electrode layer formed, thereby achieving a structure in which the thick-film electrode layer has ends covered steadily by the resin electrode layer, and thus allowing a chip-type electronic component with high reliability to be provided which can effectively relax the stress concentrated on the ends of the thick-film electrode layer due to a substrate deflection, and makes a plating solution, etc., less likely to penetrate therethrough in a plating step, etc.

In addition, in the chip-type electronic component according to the present invention, the surface Ag concentration of the resin electrode layer is controlled to 2 atom % to 8 atom % (the surface Ag concentration of the resin electrode layer is reduced intentionally). Thus, the surface Ag concentration can increase the adhesion strength between the ceramic body and the resin electrode layer more than the adhesion strength between the resin electrode layer and the plating metal layer, and with the minimum adhesion strength at the interface between the resin electrode layer and the plating metal layer, provide steady adhesion between the resin electrode layer and the plating metal layer in normal use, and make fracturing more likely to be caused at the interface between the resin electrode layer and the plating metal layer when the component is subjected to deflection stress not less than a certain level. As a result, even when the substrate is subjected to deflection stress in a substrate bending test, etc., the ceramic body can be effectively prevented from being cracked in such a way that the ceramic body is not subjected to high stress, and the present invention can thus prove to be more effective.

In addition, the case of using a resin constituent with a coupling agent added thereto as the resin constituent constituting the resin electrode layer allows the adhesion strength at the interface between the ceramic body and the resin electrode layer to be improved, and allows damage to the ceramic body to be prevented by causing more steady fracturing at the interface between the resin electrode layer and the plating metal layer, when the substrate is subjected to deflection stress in a substrate bending test, etc., and the present invention can thus prove to be more effective.

In addition, the residual stress of the resin electrode layer reduced to 4.8 MPa or less allows the adhesion strength at the interface between the ceramic body and the resin electrode layer to be improved, and allows damage to the ceramic body to be prevented by causing more steady fracturing at the interface between the resin electrode layer and the plating metal layer, when the substrate is subjected to deflection stress in a substrate bending test, etc., and the present invention can thus prove to be more effective.

In addition, the application and curing of the resin electrode paste containing a conductive constituent and a resin constituent (that is, a resin which is less likely to be volatilized during the curing by heating) which has a rate of decrease in weight of 4.8 weight % or less in the case of heating at 200° C. for 1 hour suppress the resin constituent of the resin electrode surface from being volatilized in the curing step to increase the exposure of Ag particles at the surface of the resin electrode layer, and thus prevent the surface Ag concentration of the resin electrode layer from being increased, thereby allowing the adhesion strength at the interface between the resin electrode layer and the plating metal layer to be kept low. As a result, damage to the ceramic body can be prevented by causing steady fracturing at the interface between the plating metal layer and the resin electrode layer, when the substrate is subjected to deflection stress in a substrate bending test, etc., and the present invention can thus prove to be more effective.

DETAILED DESCRIPTION OF THE INVENTION

The features of the present invention will be described below in more detail with reference to an example of the present invention.

Example 1

Figure 1:
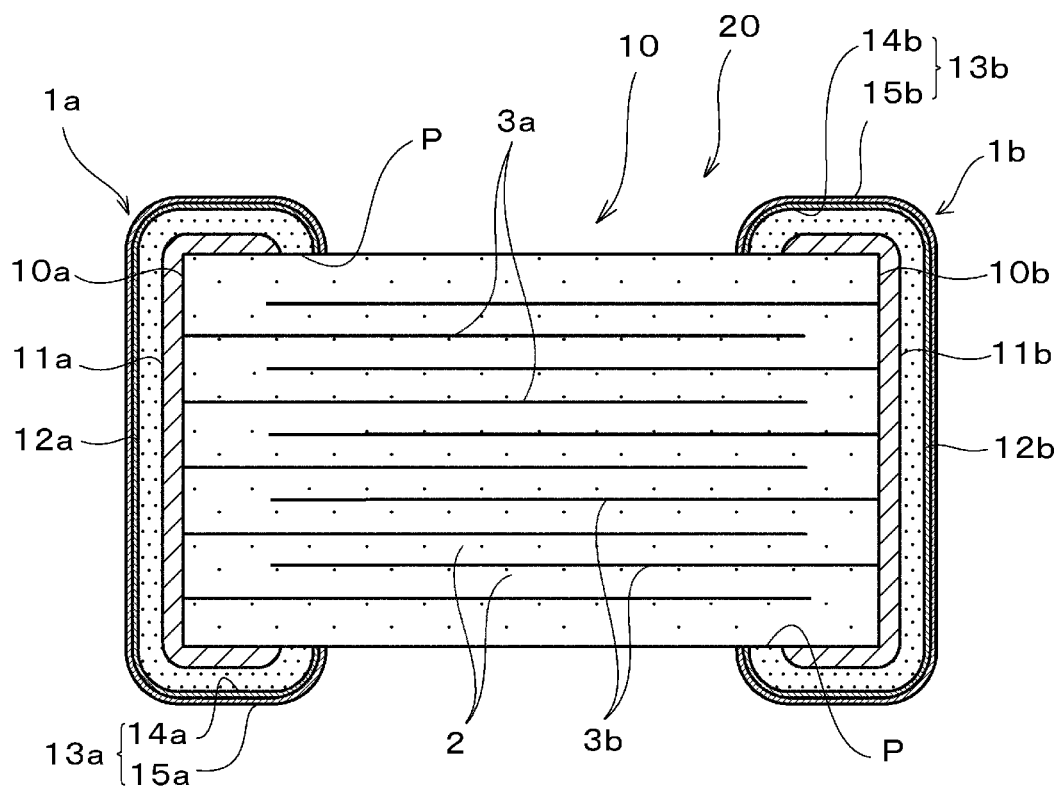
FIG. 1 is a cross-sectional view illustrating the structure of a chip-type electronic component (laminated ceramic capacitor) according to an example of the present invention.

As shown in FIG. 1, a laminated ceramic capacitor 20 according to this example includes a ceramic body 10, internal electrodes 3a and 3b stacked and provided with ceramic layers 2 interposed therebetween in the ceramic body 10, and drawn alternately to end surfaces 10a and 10b of the ceramic body 10 opposed to each other, and a pair of external electrodes 1a and 1b which provide electrical conduction to the internal electrodes 3a and 3b.

Furthermore, the external electrodes 1a and 1b include:

(a) thick-film electrode layers 11a and 11b formed on the end surfaces 10a and 10b of the ceramic body 10;

(b) resin electrode layers 12a and 12b formed to cover the thick-film electrode layers 11a and 11b and connect with the ceramic body 10 in regions outside the regions of the thick-film electrode layers 11a and 11b formed, that is, in regions (end regions of wrapping around sections) P over the regions of the thick-film electrode layers 11a and 11b formed; and (c) plating metal layers 13a and 13b formed to cover the resin electrode layers 12a and 12b.

It is to be noted that the thick-film electrode layers 11a and 11b are formed by applying and firing a conductive paste.

In addition, the resin electrode layers 12a and 12b refer to electrode layers containing a conductive constituent and a resin constituent, which are formed by applying and curing the resin electrode paste mentioned above, and are formed to cover the thick-film electrode layers 11a and 11b and connect with the ceramic body 10 in the regions (end regions of wrapping around sections) P over the regions of the thick-film electrode layers 11a and 11b formed.

In addition, the plating metal layers 13a and 13b are formed for the purposes of ensuring electrical conduction and providing solderability (soft-solderability) to the external electrodes 1a and 1b, and in this example, Ni plating metal layers 14a and 14b are formed as base layers, and Sn plating metal layers 15a and 15b are formed thereon.

Furthermore, the chip-type electronic component according to the present invention is configured so that the adhesion strength (F1) between the resin electrode layer 12a or 12b and the ceramic body 10 is higher than the adhesion strength (F2) between the resin electrode layer 12a or 12b and the plating metal layer 13a or 13b.

Next, explanations will be given on the resin electrode paste used for the production of the chip-type electronic component (laminated ceramic capacitor) according to this example, a method for producing a chip-type electronic component (laminated ceramic capacitor) with the use of the resin electrode paste, methods for measuring properties of produced chip-type electronic components (laminated ceramic capacitors), etc.

<1> Production of Resin Electrode Paste (1) Base Resin

As the resin (base resin) constituting the resin electrode paste which is used for the formation of the resin electrode layers in the present invention, known various thermosetting resins can be used such as an epoxy resin, a phenol resin, a urethane resin, a silicone resin, and a polyimide resin. Among these resins, the epoxy resin with excellent heat resistance, moisture resistance, adhesion, etc. is one of the most appropriate resins.

It is to be noted that the surface of the resin electrode desirably has a reduced (a surface Ag concentration of 2 atom % to 8 atom %) exposure of Ag (conductive filler) in the present invention, and the resin constituent which is less likely to be volatilized during drying, curing by heating, or the like is thus suitable as the resin (base resin).

Specifically, resins are preferable which have a rate of decrease in weight of 4.8 weight % or less in the case of heating at 200° C. for 1 hour in a hot-air drying oven.

It is to be noted that larger molecular weights are less likely to promote volatilization on heating in the case of resin constituents which have the same type of structure. In addition, in terms of resin structure, a resin constituent containing an inorganic element such as silicon in its main chain provides a smaller rate of decrease in weight on heating.

(2) Curing Agent

For example, in the case of using an epoxy resin as the base resin, known various compounds such as phenol based, amine based, acid anhydride based, and imidazole based compounds can be used as a curing agent for the epoxy resin.

In addition, in the case of using a phenol or acid anhydride based curing agent, the use of a curing accelerator can improve the curing property. It is possible to use, as the curing accelerator, known various compounds such as amine based and imidazole based compounds.

(3) Coupling Agent:

The coupling agent is added for the purpose of improving the adhesion strength of the resin electrode layers to the ceramic body. In particular, in the resin electrode layers, the coupling agent produces a great effect on the suppression of decrease in adhesion strength during immersion in water such as in plate processing. As the coupling agent, known various compounds can be used such as silane based and titanium based compounds. Further, in the case of using an epoxy resin as the base resin, the use of a silane based coupling agent can be expected to produce a great effect.

(4) Production of Resin Electrode Paste

Respective raw materials were prepared in accordance with the compositions as shown in Table 1, then mixed with the use of a planetary mixer, and further dispersed with a metallic triple roll mill. Then, an appropriate amount of a solvent was added to adjust the viscosity, thereby providing resin electrode pastes of sample numbers 1 to 7 in Table 1.

TABLE 1

| | Sample Number | | | | | | |
|---|---|---|---|---|---|---|---|
| | 1 | 2 | 3 | 4 | 5 | 6 | 7 |
| Epoxy Resin A (parts by weight) | 10 | 10 | 10 | 10 | 10 | — | — |
| Epoxy Resin B (parts by weight) | — | — | — | — | — | 10 | — |
| Epoxy Resin C (parts by weight) | — | — | — | — | — | — | 10 |
| Phenol Based Curing Agent (parts by weight) | 0.38 | 0.37 | 0.37 | 0.37 | 0.37 | 0.55 | 1.17 |
| Curing Accelerator (parts by weight) | 0.10 | 0.10 | 0.10 | 0.10 | 0.10 | 0.10 | 0.10 |
| Coupling Agent (parts by weight) | 0.30 | 0.30 | 0.30 | 0.30 | 0.30 | 0.30 | 0.30 |
| Solvent (parts by weight) | 15.4 | 15.4 | 15.4 | 15.4 | 15.4 | 15.6 | 16.2 |
| Silver Powder A (parts by weight) | 69.7 | 69.7 | 69.7 | 72.1 | — | — | — |
| Silver Powder B (parts by weight) | 17.4 | 17.4 | 17.4 | — | 85.0 | 86.4 | 91.4 |

Further, in Table 1:

Epoxy Resin A: Bisphenol A Epoxy Resin, Epoxy Equivalent 2800 g/eq;

Epoxy Resin B: Bisphenol A Epoxy Resin, Epoxy Equivalent 1900 g/eq;

Epoxy Resin C: Bisphenol A Epoxy Resin, Epoxy Equivalent 900 g/eq;

Phenol Based Curing Agent: Novolac-type Phenolic Resin;

Curing Accelerator: Imidazole Compound;

Coupling Agent: Silane Based Coupling Agent;

Solvent: Diethyleneglycol Monobutyl Ether;

Silver (Ag) Powder A: Spherical Silver Powder $D_{50}=1.5$ μm; and

Silver (Ag) Powder B: Flaky Silver Powder, $D_{50}=6.5$ μm.

<2> Production of Chip-Type Electronic Component

Next, a method will be described for manufacturing a chip-type electronic component (laminated ceramic capacitor) with the use of the resin electrode pastes of sample numbers 1 to 7 in Table 1, which are produced as described above.

(1) First, the ceramic body 10 is prepared which includes the internal electrodes 3a and 3b. It is to be noted that this ceramic body 10 is obtained, for example, in such a way that a laminate is formed by staking and pressure bonding of ceramic green sheets each with an internal electrode pattern printed thereon, and subjected to degreasing and firing under predetermined conditions. However, the method for creating the ceramic body 10 is not particularly limited.

(2) Then, the thick-film electrode layers 11a and 11b are formed by applying a conductive paste onto the end surfaces 10a and 10b of the ceramic body 10 and subjecting the conductive paste to firing.

(3) Next, the resin electrode paste produced as described above is applied onto the thick-film electrode layers 11a and 11b, subjected to drying under conditions of 150° C./1 h with the use of a hot-air drying oven, and then heated under conditions of 200° C./1 h to cure the resin electrode paste, thereby forming the resin electrode layers 12a and 12b.

It is to be noted that the resin electrode layers 12a and 12b cover the thick-film electrode layers 11a and 11b, and connect with the ceramic body 10 in regions (end regions of wrapping around sections) P outside the regions of the thick-film electrode layers 11a and 11b formed, so that the end surfaces 10a and 10b of the ceramic body 10 are covered by the thick-film electrode layers 11a and 11b and further covered by the resin electrode layers 12a and 12b.

(4) Next, the ceramic body 10 with the resin electrode layers 12a and 12b formed is subjected to Ni plating and Sn plating to form the plating metal layers 13a and 13b including Ni plating metal layers 14a and 14b and Sn plating metal layers 15a and 15b on the surfaces of the resin electrode layers 12a and 12b. This method provides chip-type electronic components (samples whish are subjected to the following characterization) of sample numbers 1 to 7 in Table 2, which each have a structure as shown in FIG. 1.

It is to be noted that the samples (chip-type electronic components) of sample numbers 2 and 3 in Table 2 were subjected to a wet barrel polishing treatment after the formation of the resin electrode layers (that is, at the stage before carrying out the plate processing), for the purpose of adjusting the surface Ag concentration of the resin electrode layer.

Specifically, the samples (chip-type electronic components) of sample numbers 2 and 3 in Table 2 and zirconia balls of 1 mm in diameter were put into a rigid polymer container, and the container with the samples and zirconia ball therein was filled with pure water up to 80% to 90% of the volume of the container, then covered with a lid, and rotated at 120 rpm with the use of a pot rack to carry out the wet barrel polishing treatment. It is to be noted that the wet barrel polishing treatment was carried out for 30 minutes for the sample of sample number 2, whereas the wet barrel polishing treatment was carried out for 60 minutes for the sample of sample number 3.

As a result, the surface Ag concentration of the resin electrode layer was 8 atom % for sample 2 and 9 atom % for sample 3.

<3> Measurements of Properties

The chip-type electronic components (laminated ceramic capacitors) produced as described above were examined for their properties and evaluated in accordance with the following methods.

(1) Measurement of Surface Ag Concentration of Resin Electrode Layer

In the case of producing each sample (chip-type electronic component) as described above, the surface Ag concentration (atom %) of the resin electrode layer was measured with the use of XPS (X-ray photoelectron spectrometer) after the formation of the resin electrode layer in step (3) of <2> Production of Chip-type Electronic Component.

(2) Measurement of Residual Stress

The resin electrode paste of 100 μm in thickness was formed on a phosphor bronze plate, then subjected to drying under conditions of 150° C./1 h with the use of a hot-air drying oven, and then cured by heating under conditions of 200° C./1 h, and the warpage amount h of the phosphor bronze plate was measured with the use of a measuring microscope. The residual stress σ of the cured resin electrode paste was obtained from the value of the obtained warpage amount and the property values of the cured resin electrode paste. This residual stress σ corresponds to the residual stress of the resin electrode layer.

(3) Measurement of Rate of Decrease in Weight for Resin Constituent constituting Resin Electrode Paste The resin constituent constituting the resin electrode paste from 1.0 g to 1.1 g was weighed into an aluminum foil cup, and then subjected to a heat treatment under conditions of 200° C./1 h in a hot-air drying oven to obtain rates of decrease in weight before and after the heating.

(4) Substrate Bending Test

Figure 2:
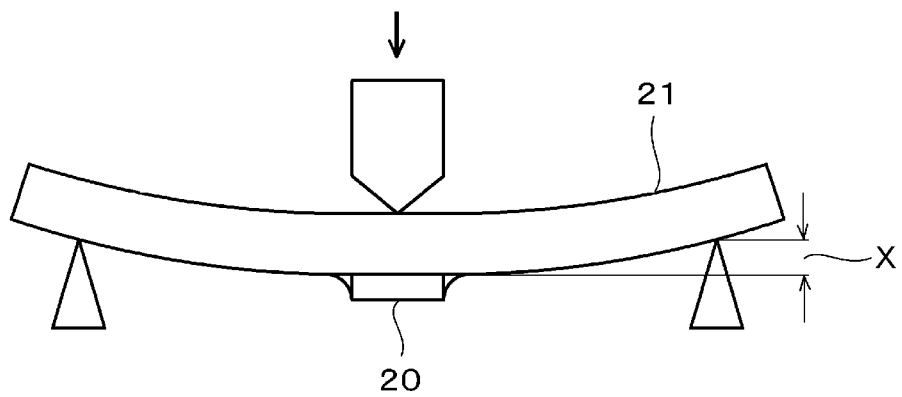
FIG. 2 is a diagram for explaining a substrate bending test carried out for samples (chip-type electronic components) manufactured in accordance with the example of the present invention.

Each sample (chip-type electronic component) produced in <2> Production of Chip-type Electronic Component was mounted onto a glass epoxy substrate with the use of lead-free solder, and then subjected to a substrate bending test by applying a deflection stress to the glass epoxy substrate from the lower side of the section with the chip-type electronic component mounted with the use of a deflection tester as shown in FIG. 2.

In the test, as shown in FIG. 2, the substrate 21 with the chip-type electronic component 20 mounted thereon was subjected to the stress until the substrate 21 underwent a deflection of 5 mm (more specifically, until the amount of deflection X in FIG. 2 reached 5 mm), and then kept for 5 seconds. Then, the chip after the test was fixed with a resin, a section of the chip was then subjected to polishing, and it was checked with the use of a stereoscopic microscope where the external electrodes were fractured, and whether or not the ceramic body was cracked.

It is to be noted that in the column "Fractured Point in Substrate Bending Test" of Table 2 which shows the evaluation results, the grade "A" is put if the fractured point (peeling point) of the external electrode is located at the interface between the resin electrode layer and the plating metal layer, whereas the grade "B" is put if the fractured point (peeling point) thereof is located at the interface between the ceramic body and the resin electrode layer.

In addition, for the column "Presence or Absence of Cracked Ceramic Body in Substrate Bending Test", the sample was determined as "No (Non-Defective)" if the ceramic body was not found to be cracked, whereas the sample was determined as "Yes (Defective)" if the sample was found to be cracked.

(5) Electrical Property

In order to evaluate the electrical property for each sample, the equivalent series resistance was measured for each sample in accordance with the following method. For the measurement, an impedance analyzer was used to measure the equivalent series resistance under the condition of a measurement frequency of 1 MHz. The sample was determined as ○ (Good) if the equivalent series resistance had a value of 100 mΩ or less, whereas the sample was determined as Δ (Acceptable) if the equivalent series resistance had a value more than 100 mΩ. This is because depending on the intended use, the samples may be practicable in some cases even if the equivalent series resistance has a value more than 100 mΩ.

The properties checked as described above are shown in Table 2.

electrode layer increased by barrel polishing to 9 atom %, the external electrode was fractured at the interface between the ceramic body and the resin electrode layer or near the interface in the substrate bending test, and the ceramic body was found to have cracking caused. This is to be believed because the high surface Ag concentration of the resin electrode layer of 9 atom % thus increased the adhesion strength between the resin electrode layer and the plating metal layer more than the adhesion strength between the ceramic body and the resin electrode layer, and as a result, the ceramic body was subjected to a high stress in the substrate bending test to cause the ceramic body to be cracked.

In addition, in the case of the sample of sample number 4 with the low surface Ag concentration of the resin electrode layer of 1 atom %, the external electrode was fractured at the

TABLE 2

| | Sample Number | | | | | | |
|---|---|---|---|---|---|---|---|
| | 1 | 2 | 3 | 4 | 5 | 6 | 7 |
| Surface Ag Concentration of Resin Electrode Layer (atom %) | 2 | 8 | 9 | 1 | 7 | 8 | 10 |
| Residual Stress of Resin Electrode Paste (MPa) | 4.7 | 4.7 | 4.7 | 3.9 | 2.6 | 4.8 | 9.3 |
| Rate of Decrease in Weight of Resin at 200° C. (weight %) | 2 | 2 | 2 | 2 | 2 | 3 | 6 |
| Fractured Point of Ceramic Body in Substrate Bending Test | A | A | B | A | A | A | B |
| Presence or Absence of Cracked Ceramic Body in Substrate Bending Test | No (Non-Defective) | No (Non-Defective) | Yes (Defective) | No (Non-Defective) | No (Non-Defective) | No (Non-Defective) | Yes (Defective) |
| Electrical Property | ○ | ○ | ○ | Δ | ○ | ○ | ○ |
| Comprehensive Evaluation | ○ | ○ | X | Δ | ○ | ○ | X |

(6) Evaluation

As shown in Table 2, in the case of the samples of sample numbers 1, 2, 5, and 6 with the silver concentration of the resin electrode surface in the range of 2 atom % to 8 atom %, the external electrode was fractured at the interface between the resin electrode layer and the plating metal layer or near the interface in the substrate bending test, and the ceramic body was found to have no cracking caused. This is because the silver concentration of the resin electrode surface controlled in the range of 2 atom % to 8 atom % thus increased the adhesion strength between the ceramic body and the resin electrode layer more than the adhesion strength between the resin electrode layer and the plating metal layer to cause the external electrode to be fractured at the interface between the resin electrode layer and the plating metal layer (or near the interface) in the substrate bending test, thereby avoiding the ceramic body from being subjected to such a high stress that causes cracks.

On the other hand, in the case of the sample of sample number 3 with the surface Ag concentration of the resin interface between the resin electrode layer and the plating metal layer or near the interface in the substrate bending test, and the ceramic body was found to have no cracking caused. However, it has been confirmed that the equivalent series resistance has a large value.

This is believed to be because the low surface Ag concentration of the resin electrode layer and the poor platability in the case of the formation of the plating metal layer increased the value of the equivalent series resistance.

It is to be noted that while the surface Ag concentration of the resin electrode layer lower than 2 atom % increases the value of the equivalent series resistance as described above, this increased value of the equivalent series resistance is not such a fatal defect that causes the ceramic element to be cracked, and the chip-type electronic component may fall within standards in some cases depending on the intended use of the chip-type electronic component. Thus, the present invention also has significance when the surface Ag concentration of the resin electrode layer falls below 2 atom %.

In addition, in the case of the sample of sample number 7 using the resin electrode paste containing a resin constituent with a high rate of decrease in weight of 6 weight % at 200° C., it has been confirmed that the high surface Ag concentration of the resin electrode layer of 10 atom % causes fracturing at the interface between the ceramic body and the resin electrode layer or near the interface and causes the ceramic body to be cracked in the substrate bending test.

This is believed to be because in the step of curing the resin electrode paste by heating to form the resin electrode layers, the resin constituent of the resin electrode surface was volatilized to increase the ratio of Ag particles exposed from the surface of the resin electrode layer and thus increase the surface Ag concentration of the resin electrode layer, and increase the residual stress of the resin electrode layer, and as a result, the adhesion strength at the interface between the resin electrode layer and the plating metal layer was increased more than the adhesion strength between the ceramic body and the resin electrode layer to cause fracturing at the interface between the ceramic body and the resin electrode layer (or near the interface), and cause the ceramic body to be cracked.

The results described above have confirmed that the case of controlling the surface Ag concentration of the resin electrode layer to 2 atom % to 8 atom % allows the adhesion strength between the ceramic body and the resin electrode layer to be increased more than the adhesion strength between the resin electrode layer and the plating metal layer, and, even when the substrate is subjected to deflection stress in a substrate bending test, etc., the ceramic body can be prevented from being subjected to high stress to avoid the ceramic body from being cracked.

Further, in this example, from the standpoint of improvement in the adhesion strength at the interface between the ceramic body and the resin electrode layer, the resin electrode paste with the coupling agent added thereto was used to improve the effects of preventing the adhesion strength of the resin electrode layer to the ceramic body form being decreased in the plate processing, and reducing the residual stress of the resin electrode layer to increase the adhesion strength at the interface between the resin electrode layer and the ceramic body. However, in some cases, it is also possible to use a resin electrode paste with no coupling agent added thereto.

In addition, while a case of the external electrode including the thick-film electrode layer has been described in the example, the present invention can also be applied to structures including no thick-film electrode layer, that is, cases of structures configured to include the resin electrode layer formed directly on the end surface of the ceramic body and the plating metal layer formed thereon.

Furthermore, the present invention can also be applied to cases of structures configured in such a way that plating is applied to exposed sections of the internal electrodes at the end surface of the ceramic body, the resin electrode layer is then formed on the end surface, and the plating metal layer is formed thereon.

It is to be noted that while the present invention is intended to prevent cracks from being caused in the ceramic body, by causing peeling at the interface between the resin electrode layer and the plating metal layer when the substrate is subjected to deflection stress, it is also possible to provide a structure with a double fail safe function as described in the following Modification Examples 1 and 2.

Modification Example 1

Figure 3:
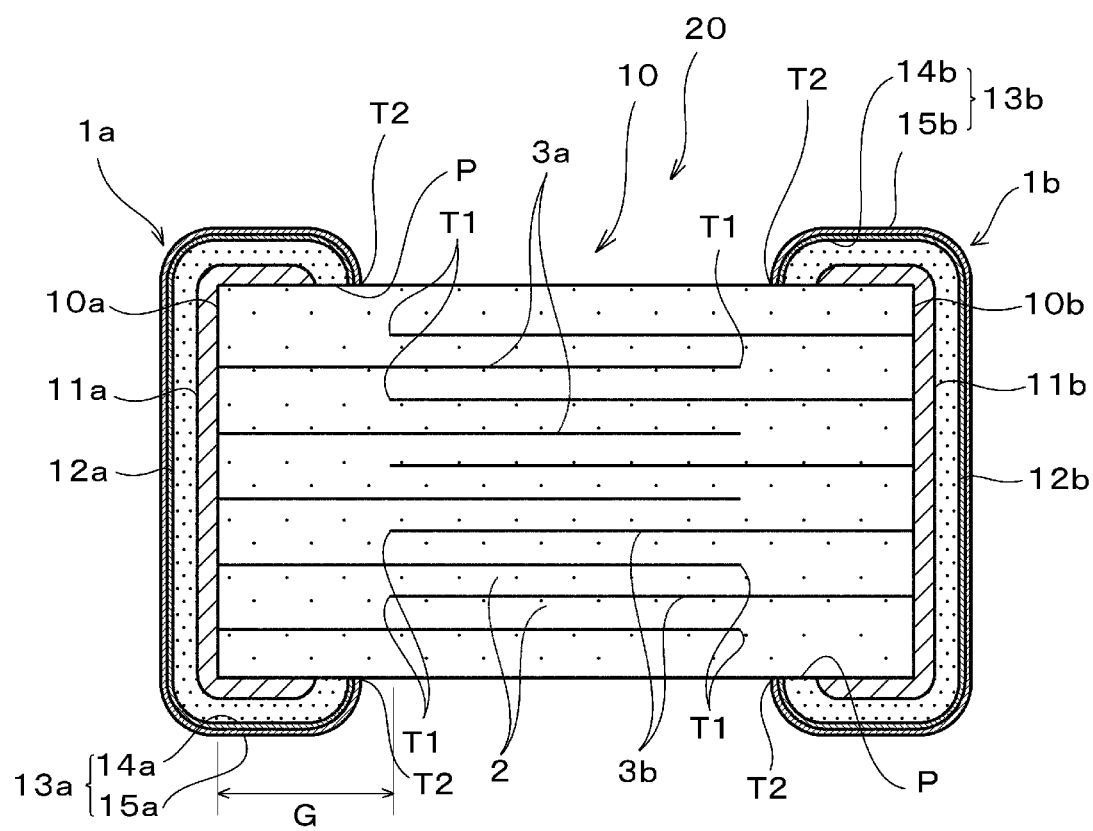
FIG. 3 is a cross-sectional view illustrating a modification example of the chip-type electronic component (laminated ceramic capacitor) according to the example of the present invention.

For example, as shown in FIG. 3, short internal electrodes 3a and 3b are formed so that the internal electrodes 3a or 3b connected to one of a pair of external electrodes 1a and 1b which differ in polarity have an end T1 not reaching the projected position of an end T2 of a wrapping around section (turned section) of the external electrode 1b or 1a on the opposite side to the external electrode 1a or 1b connected to the internal electrodes 3a or 3b (that is, a large gap G is provided in the length direction). This structure can avoid fatal trouble even if the ceramic body 10 is cracked. It is to be noted in FIG. 3 that sections designated by the same reference numerals as those in FIG. 1 identify with or correspond to the sections designated by the respective reference numerals in FIG. 1.

Modification Example 2

Figure 4:
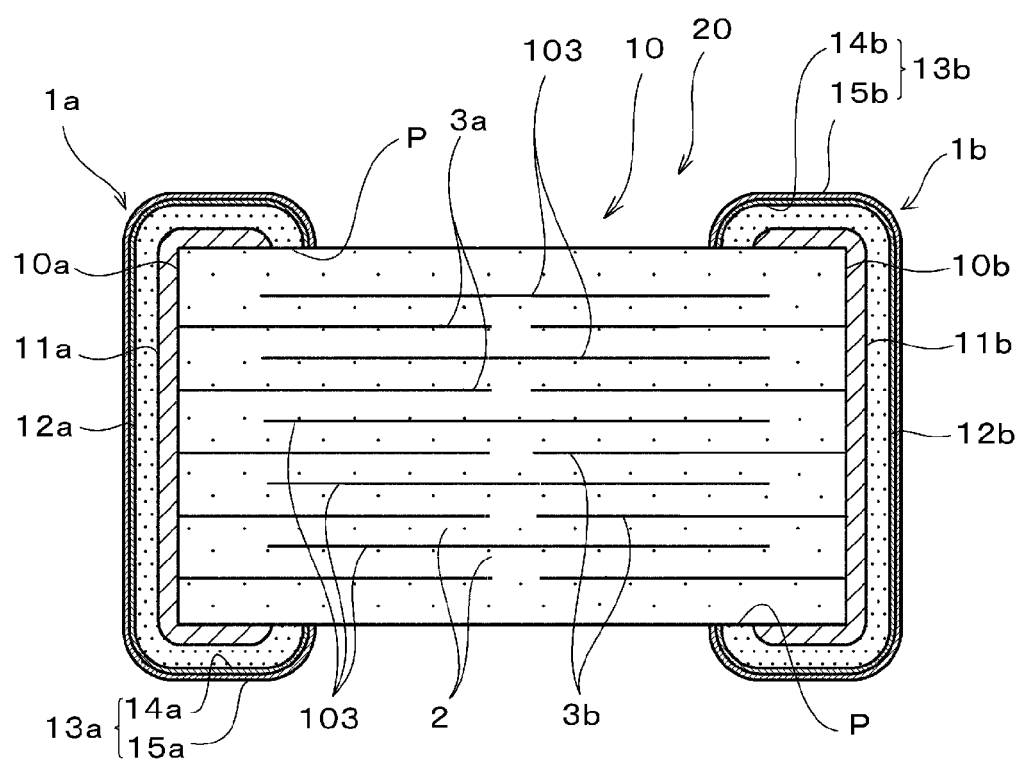
FIG. 4 is a cross-sectional view illustrating another modification example of the chip-type electronic component (laminated ceramic capacitor) according to the example of the present invention.

For example, as shown in FIG. 4, a ceramic body 10 is configured to include therein internal electrodes (connected internal electrodes) 3a and 3b connected to a pair of external electrodes 1a and 1b which differ in polarity and internal electrodes (non-connected internal electrodes) 103 connected to neither the external electrode 1a or 1b, which are provided alternately in the stacking direction so that capacitance is acquired with the non-connected internal electrodes 103 interposed (that is, configured so that capacitors are connected in series in an equivalent circuit). This structure can avoid fatal trouble from being caused even if the ceramic body is cracked. It is to be noted in FIG. 4 that sections designated by the same reference numerals as those in FIG. 1 identify with or correspond to the sections designated by the respective reference numerals in FIG. 1.

Furthermore, while cases of the laminated ceramic capacitor have been described in the example, the present invention can be applied to not only laminated ceramic capacitors but also various chip-type electronic components which have the external electrode including the resin electrode layer and the plating metal layer.

The present invention is further not to be limited to the example described above in the other respects, and various modifications and changes can be made within the scope of the present invention, in terms of the types of the electrode material constituting the thick-film electrode layer and of the metal material constituting the plating metal layer, the type of the ceramic material constituting the ceramic body, etc.

What is claimed is:

1. A chip-type electronic component comprising:
 a ceramic body including a first electrode; and
 a second electrode electrically connected to a first end of the first electrode,
 wherein the second electrode includes:
  a resin electrode layer containing a conductive constituent and a resin constituent, the resin electrode layer covering at least an end surface of the ceramic body, and connected to the first electrode and the ceramic body; and
  a plating metal layer covering the resin electrode layer,
 wherein a first adhesion strength between the ceramic body and the resin electrode layer is greater than a second adhesion strength between the resin electrode layer and the plating metal layer, and
 wherein the resin electrode layer has a surface Ag concentration of 2 atom % to 8 atom %.

2. The chip-type electronic component according to claim 1, wherein the resin electrode layer is connected directly or indirectly to the first electrode.

3. The chip-type electronic component according to claim 1, wherein the second electrode further includes a film electrode layer on an end surface of the ceramic body and electrically connected to the first electrode, and the resin electrode layer covers the film electrode layer and is connected to the ceramic body in a region outside a region where the film electrode layer is located on the end surface of the ceramic body.

4. The chip-type electronic component according to claim 1, wherein the resin constituent is a thermosetting resin.

5. The chip-type electronic component according to claim 1, wherein the resin electrode layer is provided by applying and curing a resin electrode paste containing the conductive constituent and the resin constituent, the resin constituent having a rate of decrease in weight of 4.8 weight % or less when heated at 200° C. for 1 hour.

6. The chip-type electronic component according to claim 1, wherein the second electrode further includes a plating metal layer on a surface of the resin electrode layer.

7. The chip-type electronic component according to claim 1, wherein the first electrode has a second end that does not extend to a position covered by a wrapped around section of a third electrode on an opposite side of the ceramic body to that of the second electrode.

8. The chip-type electronic component according to claim 1, further comprising a third electrode within the ceramic body, the third electrode not being connected to the first or second electrodes.

9. A chip-type electronic component comprising:
a ceramic body including a first electrode; and
a second electrode electrically connected to a first end of the first electrode,
wherein the second electrode includes:
    a resin electrode layer containing a conductive constituent and a resin constituent, the resin electrode layer covering at least an end surface of the ceramic body, and connected to the first electrode and the ceramic body; and
    a plating metal layer covering the resin electrode layer,
wherein a first adhesion strength between the ceramic body and the resin electrode layer is greater than a second adhesion strength between the resin electrode layer and the plating metal layer, and
wherein the resin constituent includes a silane based coupling agent.

10. The chip-type electronic component according to claim 9, wherein the resin electrode layer is connected directly or indirectly to the first electrode.

11. The chip-type electronic component according to claim 9, wherein the second electrode further includes a film electrode layer on an end surface of the ceramic body and electrically connected to the first electrode, and the resin electrode layer covers the film electrode layer and is connected to the ceramic body in a region outside a region where the film electrode layer is located on the end surface of the ceramic body.

12. The chip-type electronic component according to claim 9, wherein the resin electrode layer is provided by applying and curing a resin electrode paste containing the conductive constituent and the resin constituent, the resin constituent having a rate of decrease in weight of 4.8 weight % or less when heated at 200° C. for 1 hour.

13. The chip-type electronic component according to claim 9, wherein the first electrode has a second end that does not extend to a position covered by a wrapped around section of a third electrode on an opposite side of the ceramic body to that of the second electrode.

14. The chip-type electronic component according to claim 9, further comprising a third electrode within the ceramic body, the third electrode not being connected to the first or second electrodes.

15. A chip-type electronic component comprising:
a ceramic body including a first electrode; and
a second electrode electrically connected to a first end of the first electrode,
wherein the second electrode includes:
    a resin electrode layer containing a conductive constituent and a resin constituent, the resin electrode layer covering at least an end surface of the ceramic body, and connected to the first electrode and the ceramic body; and
    a plating metal layer covering the resin electrode layer,
wherein a first adhesion strength between the ceramic body and the resin electrode layer is greater than a second adhesion strength between the resin electrode layer and the plating metal layer, and
wherein the resin electrode layer has a residual stress of 4.8 MPa or less.

16. The chip-type electronic component according to claim 15, wherein the resin electrode layer is connected directly or indirectly to the first electrode.

17. The chip-type electronic component according to claim 15, wherein the second electrode further includes a film electrode layer on an end surface of the ceramic body and electrically connected to the first electrode, and the resin electrode layer covers the film electrode layer and is connected to the ceramic body in a region outside a region where the film electrode layer is located on the end surface of the ceramic body.

18. The chip-type electronic component according to claim 15, wherein the resin electrode layer is provided by applying and curing a resin electrode paste containing the conductive constituent and the resin constituent, the resin constituent having a rate of decrease in weight of 4.8 weight % or less when heated at 200° C. for 1 hour.

19. The chip-type electronic component according to claim 15, wherein the first electrode has a second end that does not extend to a position covered by a wrapped around section of a third electrode on an opposite side of the ceramic body to that of the second electrode.

20. The chip-type electronic component according to claim 15, further comprising a third electrode within the ceramic body, the third electrode not being connected to the first or second electrodes.

* * * * *